United States Patent
Zeng et al.

(10) Patent No.: US 7,839,771 B2
(45) Date of Patent: Nov. 23, 2010

(54) BACKHAUL FAILOVER METHOD AND SYSTEM FOR A WIRELESS NETWORK

(75) Inventors: Jianlin Zeng, San Jose, CA (US); Changming Liu, Cupertino, CA (US)

(73) Assignee: Aerohive Networks, Inc., Sunnyvale, CA (US)

( * ) Notice: Subject to any disclaimer, the term of this patent is extended or adjusted under 35 U.S.C. 154(b) by 124 days.

(21) Appl. No.: 12/070,863

(22) Filed: Feb. 21, 2008

(65) Prior Publication Data

US 2009/0213730 A1 Aug. 27, 2009

(51) Int. Cl.
G01R 31/08 (2006.01)
(52) U.S. Cl. ........................................ 370/225; 370/312
(58) Field of Classification Search ......... 370/200–253, 370/503; 709/203
See application file for complete search history.

(56) References Cited

U.S. PATENT DOCUMENTS

| | | | |
|---|---|---|---|
| 7,057,566 B2 | 6/2006 | Theobold | |
| 7,085,224 B1 | 8/2006 | Oran | |
| 7,164,667 B2 | 1/2007 | Rayment et al. | |
| 7,181,530 B1 | 2/2007 | Halasz et al. | |
| 7,251,238 B2 | 7/2007 | Joshi et al. | |
| 2002/0091813 A1* | 7/2002 | Lamberton et al. | 709/223 |
| 2005/0099983 A1* | 5/2005 | Nakamura et al. | 370/338 |
| 2007/0078663 A1 | 4/2007 | Grace | |
| 2007/0140191 A1 | 6/2007 | Kojima | |
| 2008/0090575 A1* | 4/2008 | Barak et al. | 455/444 |
| 2008/0170527 A1* | 7/2008 | Lundsgaard et al. | 370/312 |

* cited by examiner

*Primary Examiner*—Ricky Ngo
*Assistant Examiner*—Iqbal Zaidi
(74) *Attorney, Agent, or Firm*—Law Office of Jonathan Hollander PC (57) ABSTRACT

A method and corresponding system for providing for recovering from a failure of a wired link used for communication between the first access point and a wired network. The first access point has at least two radios including a first radio and a second radio each for providing a wireless communications link. The method including selectively configuring the radios in an access mode for enabling a communications path with a corresponding client node to enable each client node to have a communication path via the first access point to the wired network, wherein the first and second radios are enabled to be associated with a first and second client node, respectively. The method and system includes providing communications paths for the client nodes to the wired network in response to detection of loss of the wired link to the first access point by selectively reconfiguring the second radio to a backhaul mode.

21 Claims, 7 Drawing Sheets

BACKHAUL FAILOVER METHOD AND SYSTEM FOR A WIRELESS NETWORK

FIELD OF THE INVENTION

This invention relates to wireless networks and more particularly to a method and system for enabling a wireless network to prevent loss of connection to a wired network.

BACKGROUND OF THE INVENTION

Figure 1:
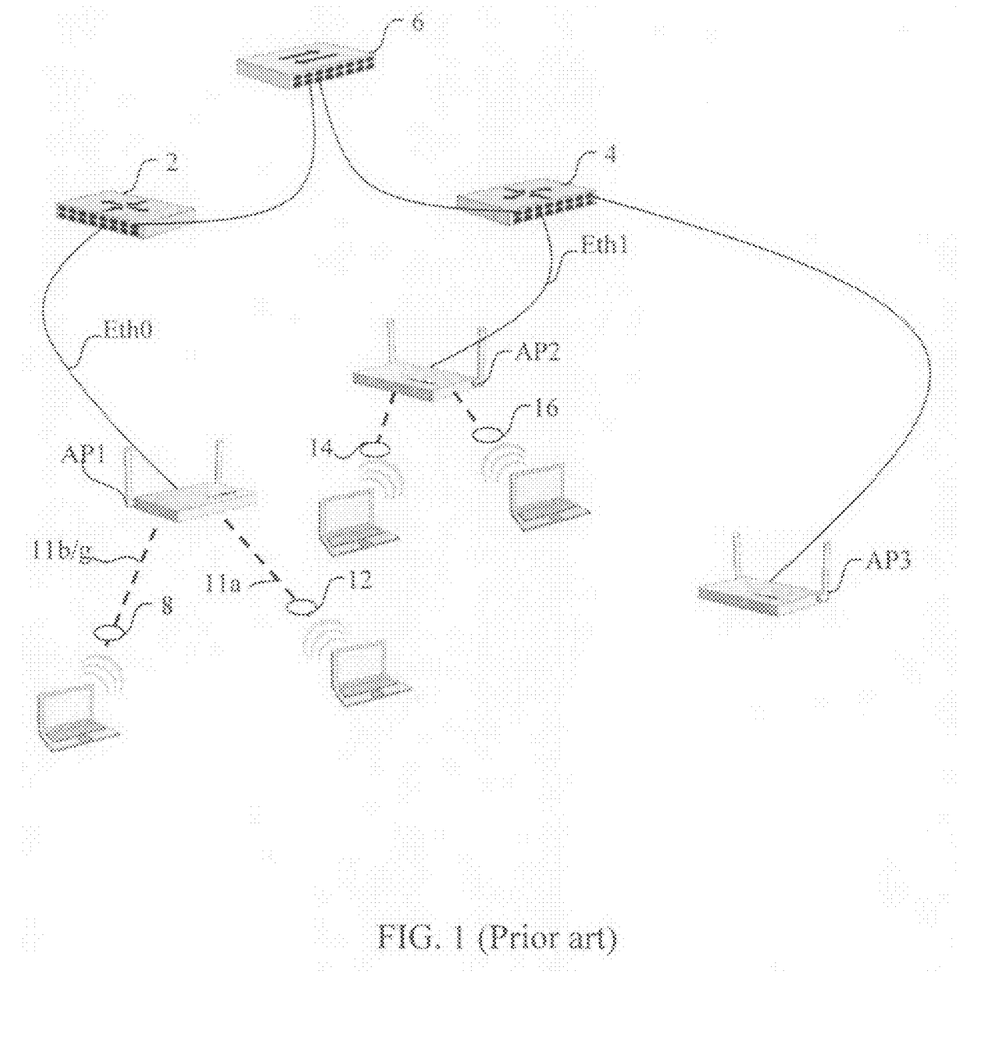
FIG. 1 is a diagram illustrating a known access topology which depends on a wired architecture to connect all Access Points back to a backhaul network.

An Access Point (AP) is typically provided in a wireless access network to enable wireless client nodes to connect to a wired backhaul network. FIG. 1 illustrates a known backhaul network topology 10 for connecting all access points in a wireless access network to a backhaul network. As shown in FIG. 1, access points AP1 and AP2 each have a wired backhaul connection to an external backhaul network, such as a local area network (LAN) or the Internet. Each wired backhaul connection enables access to and from the external network in a conventional manner, e.g., by means of Ethernet links Eth0 and Eth1 to respective access switches 2, 4, and finally to a distribution switch 6. It is well known in the art that other access points, e.g., an access point AP3, can be linked to the external network in a similar fashion.

Figure 2:
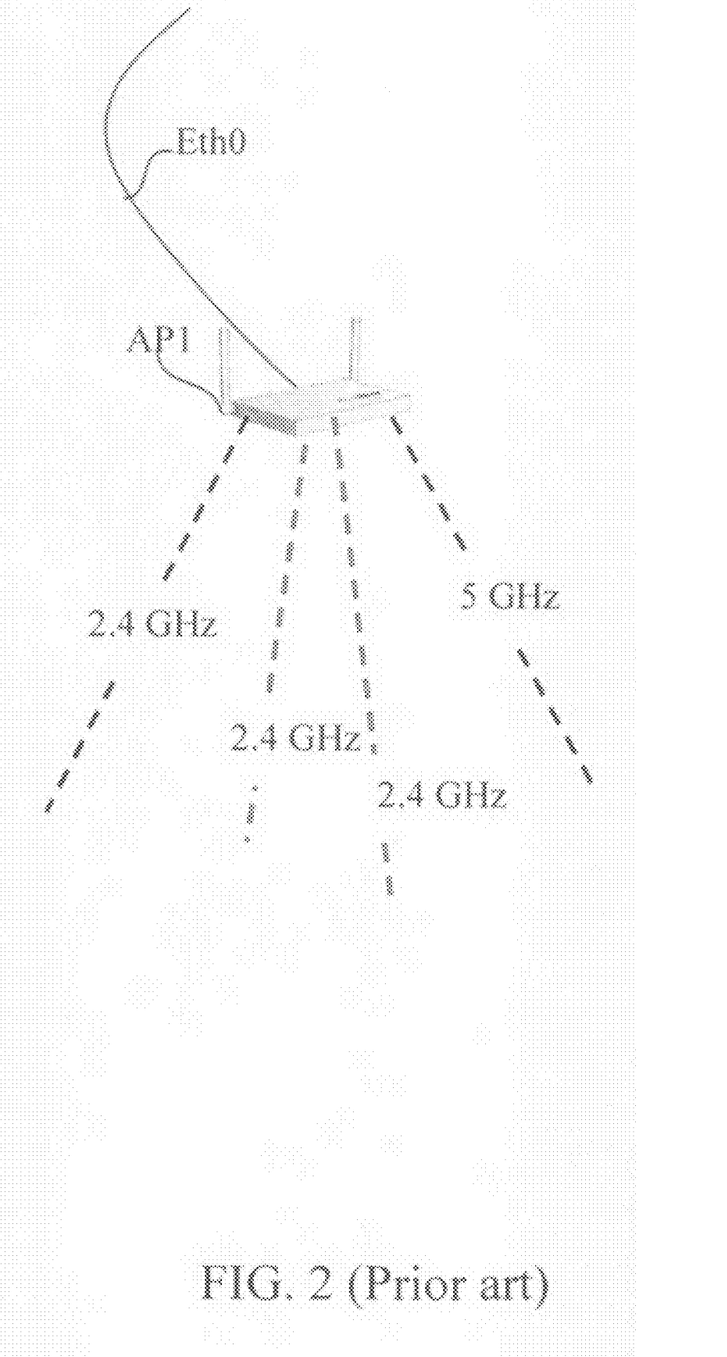
FIG. 2 is a diagram illustrating an access point in the system in FIG. 1 having multiple radios.

The access points AP1 and AP2 typically include at least two wireless radio transceivers for providing wireless interfaces to connect client nodes to the backhaul network via these access points. The wireless radio transceiver interfaces typically operate in accordance with the International Electrical and Electronic Engineers (IEEE) 802.11 Standard, such as version IEEE Std. 802.11-1997. According to the Standard, there are various officially published protocols, including 802.11b, 802.11g, and 802.11a. A wireless channel operating in accordance with 802.11b or 11g operates in the 2.4 GHz range. A channel operating in accordance with 802.11a operates in the 5 GHz range. In the example in FIG. 1, AP1 provides one radio for enabling client node 8 to connect wirelessly to the wired backhaul network in accordance with an 802.11b or 802.11g interface protocol. This wireless connection is identified in FIG. 1 as "11b/g". A second radio is provided for enabling client node 12 to connect wirelessly to the wired backhaul network in accordance with an 802.11a. This wireless connection is identified in FIG. 1 as "11a" interface protocol. Similarly, second access point AP2 enables wireless client nodes 14 and 16 to connect to the wired backhaul network via an Ethernet connection Eth1 and respective wireless connections 11b/g and 11a. Although the client nodes 8, 12, 14, and 16 are each shown connected to just one computer in the example in FIG. 1, these client nodes may be connected to many computers and to other networks. The access points AP1 and AP2 each have their wireless channels 11b/g and 11a statically configured in an "access" mode for providing wireless access to the corresponding client nodes. FIG. 2 illustrates a known access point AP1 in the system in FIG. 1. The access point includes at least two radios, including one radio operating at 2.4 GHz, e.g., for 11b/g, and one radio operating at 5 GHz, e.g., for 11a. Additional 2.4 GHz radios may be provided in AP1, shown in phantom in FIG. 2.

Alternatively, one or more of the wireless channels may be operated in accordance with other suitable protocols including, for example, the 802.11n protocol (also commonly called the 11n protocol.). 801.11n is currently just a proposed protocol, the specification of which has not yet been finalized and officially published by IEEE.

A drawback of the known topology is that, if one of the wired Ethernet links fails, such as due to uplink network problems, the access point associated with that wired link will lose connection to the backhaul network. Consequently, that access point will be unable to continue to provide wireless network access to its associated client nodes. That is, no "failover" capability is provided to recover from the loss of the wired connection in topology.

Figure 3:
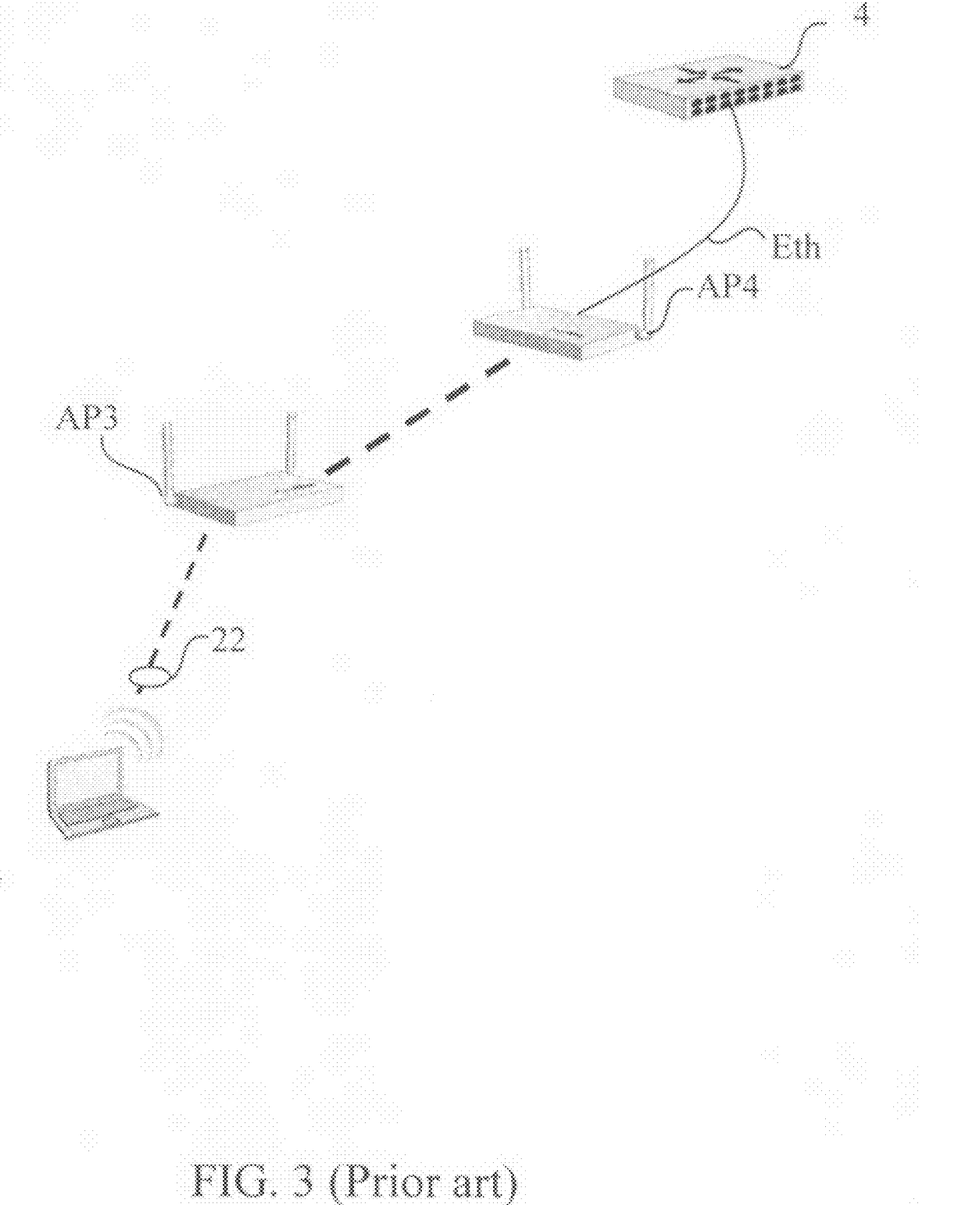
FIG. 3 illustrates a known wireless mesh network topology in which an access point has one radio statically configured in a access mode and another radio statically configured in a backhaul mode.

FIG. 3 illustrates a known wireless mesh network topology in which an access point has one radio statically configured in an access mode and another radio statically configured in a backhaul mode. As shown in FIG. 3, an access point AP3 has one radio statically configured in an access mode for enabling a communications path with a corresponding client node 22. Access point AP3 according to topology has no direct wired connection to the backhaul network. Access point AP3 has another wireless radio that is statically configured in a backhaul mode. According to this backhaul mode, access point AP3 connects wirelessly to another access point AP4 which has a wired Ethernet link, Eth, to a backhaul switch 4. In this way, access point AP3 and access point AP4 together enable a communications path with client node 22 to enable it to have a path to the wired backhaul network.

A drawback of the wireless mesh network topology is that it does not provide failover to protect the wired backhaul connection. That is, if the wired Ethernet link Eth fails, access points AP3 and AP4, and in turn client node 22, will lose connection to the backhaul switch 4. Another drawback of topology is that one of the two radios in AP3 must be dedicated to the backhaul mode. Consequently, that dedicated radio cannot operate in an access mode to provide access service to client nodes. As a result, topology reduces the number of client nodes which can be served by the access point AP3 and reduces the total access bandwidth provided by this single access point. What is needed is an access point that provides failover capability to enable recovery from a failure of the wired backhaul connection, while providing efficient access in normal operation in order to maximize the access services to its wireless clients. Therefore, what is needed is a method and system in an access point that enables one of its radios to be selectively reconfigured from an access mode to a wireless backhaul mode in order to provide an alternative communications path to the wired network in response to detection of loss of the wired link to the access point.

What is also needed is a system and method to provide the aforementioned failover capability while only affecting the access point which lost the connection to the backhaul network and its neighbor access points, without affecting the rest of the network.

SUMMARY OF THE INVENTION

Broadly stated, the present invention provides a method for recovering from a failure of a wired link used for communication between a first access point and a wired network, the first access point having at least two radios including a first radio and a second radio each for providing a wireless communications link, the method comprising selectively configuring the radios in an access mode, each radio in the access mode for enabling a communications path with a corresponding client node to enable each client node to have a communication path via the first access point to the wired network, wherein the first radio is enabled to be associated with a first client node, and wherein the second radio is enabled to be associated with a second client node; and providing a communications path for the first and second client nodes to the wired network in response to detection of loss of the wired link to the first access point by selectively reconfiguring the second radio to a backhaul mode, comprising detecting the loss of the wired link to the first access point; disassociating any client node from the second radio; detecting a neighboring access point which can provide a link to the wired network for the first access point; causing the second radio to provide a wireless link to the detected neighboring access point; and causing the first access point to enable any client nodes associated with the first radio and any client nodes that had been associated with the second radio to have a communication path to the wired network via the first radio wireless link, the second radio wireless link, and the detected neighboring access point's wired link.

These and other embodiments, features, aspects, and advantages of the invention will become better understood with reference to the following description, appended claims and accompanying drawings.

Reference symbols or names are used in the Figures to indicate certain components, aspects or features shown therein, with reference symbols common to more than one Figure indicating like components, aspects or features shown therein.

DETAILED DESCRIPTION OF THE INVENTION

Figure 4:
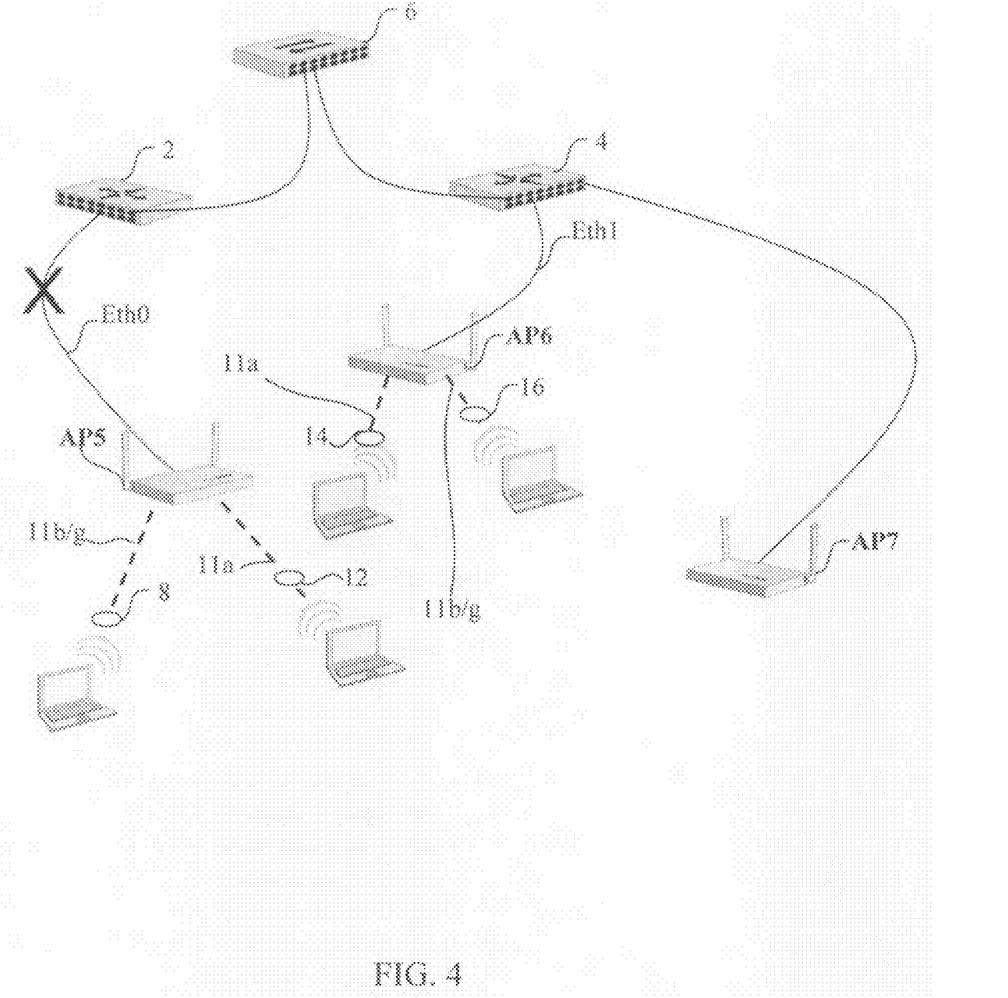
FIG. 4 illustrates an exemplary failure state prior to recovery according to the present invention.

The present invention provides a method and system for recovering from a failure of a wired link used for communication between an access point and a wired network. FIG. 4 illustrates an exemplary failure state prior to recovery according to the present invention. The wired link between a first access point AP5 and a backhaul switch 2 of the wired backhaul network is lost as seen in FIG. 4, such that there is no path between AP5 and the wired network. The exemplary system shown in FIG. 4 is similar to the system shown in FIG. 1, except that FIG. 4 includes the failure and deploys at least two access points AP5 and AP6 operating according to the method of the present invention.

Figure 5:
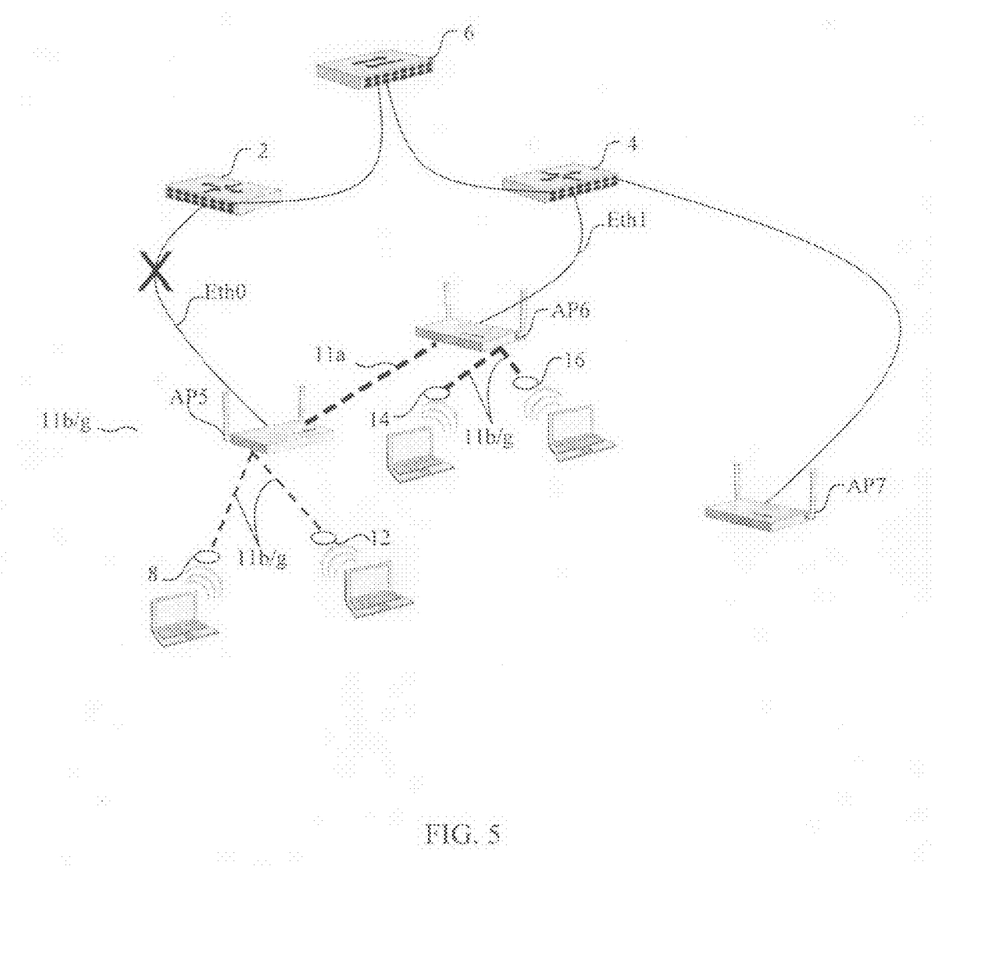
FIG. 5 is an exemplary diagram illustrating an aspect of the operation of the method and system according to the present invention wherein a communications path to the wired network is provided for any client nodes associated with a first access point in response to detection of loss of the wired link thereto by selectively reconfiguring a second radio of the first access point from an access mode to a backhaul mode.

In the example in FIG. 4, prior to the recovery process, each access point, AP5, AP6, and AP7 has two radios selectively configured in an access mode. The recovery process from the failure in FIG. 4 according to the present invention is illustrated in the example shown in FIG. 5. FIG. 5 is an exemplary diagram illustrating aspects of the method and system according to the present invention wherein a communications path to the wired network is provided for any client nodes associated with a first access point in response to detection of loss of the wired link to the first access point by selectively reconfiguring a second radio from an access mode to a backhaul mode. According to the example in FIG. 5, each access point, AP5, and AP6 has at least two radios including a first radio and a second radio each for providing a wireless communications link. Aspects of the method and system illustrated in the example in FIG. 5 are further described in a flow chart in FIG. 6.

Figure 6:
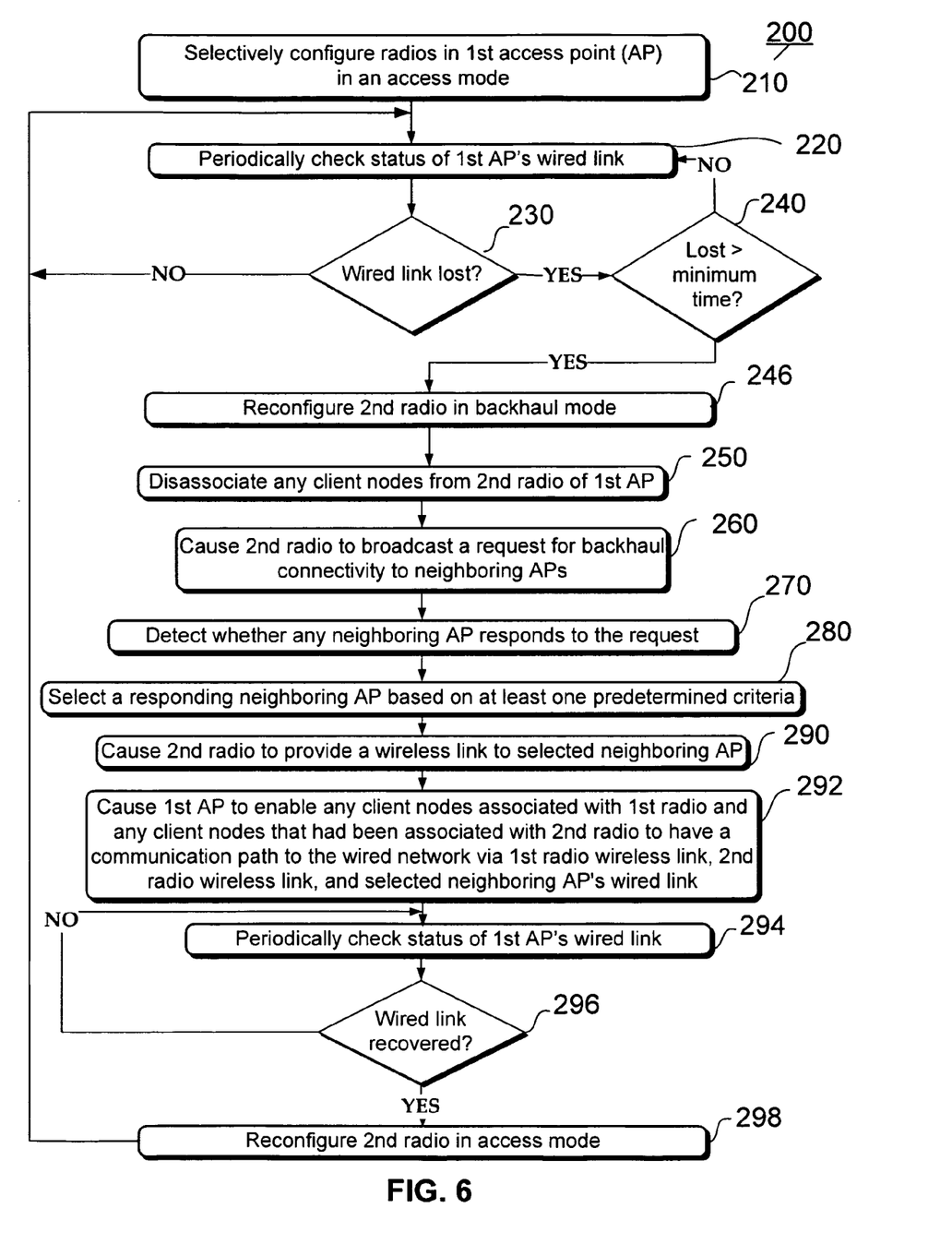
FIG. 6 is a flow chart illustrating, in a first access point, the method for recovering from a failure of a wired link used for communication between the first access point and a wired network, according to an embodiment of the present invention.

FIG. 6 is a flow chart 200 illustrating, in a first access point, the method for recovering from a failure of a wired link used for communication between the first access point and a wired network, according to the present invention. In step 210, prior to detection of the failure, each radio in the first access point, e.g., AP5 in FIG. 5, is selectively configured in an access mode. The access mode is for enabling a communications path with a corresponding client node 8 and 12 to enable each one to have a communication path via AP5 to the wired network. In the access mode, the first radio of AP5 operates preferably at 2.4 GHz in accordance with 11b/g and is enabled to be associated with a first client node 8, as shown in FIG. 5. A second radio of AP5 is enabled to be associated with a second client node 12 and operates preferably at 5 GHz in accordance with 11a. Alternatively, one or more of the radios may be operated in accordance with other suitable protocols including, but not limited to, 802.11n.

Prior to the loss of the wired Eth0 link due to the failure as seen in FIG. 5, the selectively configuring of the first and second radios of the first access point AP5 in the access mode enables each corresponding client node 8 and 12 to have a communication path via AP5 to the wired network, i.e., via Ethernet link Eth0 and backhaul switch 2. The method will be described in further detail regarding the exemplary failure that resulted in loss of the wired link Eth0 to a first access point AP5 shown in FIG. 5.

In Step 220 in FIG. 6, the first access point periodically checks the status of the first access point's wired link. In the example in FIG. 5, the wired link is an Ethernet link and the first access point AP5 has an Ethernet port for providing a physical link to the Ethernet link Eth0. According to one embodiment, the Ethernet port has a link status indicative of the status of the wired link, and the link status is obtained by the first access point which determines therefrom whether the wired link is lost.

In the example in FIG. 5, the Ethernet port of the first access point AP5 is at one end of the Ethernet link Eth0 and a switch 2 is at the other end. The switch 2 may be a gateway switch, also referred to herein as a gateway, which has an Internet Protocol (IP) address. The gateway switch might alternatively be a different switch several hops away from the first access point AP5, e.g., switch 6 in FIG. 5. The method according to an embodiment of the present invention detects the loss of the connection, i.e., the wired link, between the first access point AP5 and the gateway. For the example where the gateway is switch 6, a cause of the loss of the wired link between the first access point AP5 and the gateway could be due to a failure anywhere along the connection therebetween, e.g., between switch 2 and switch 6.

The gateway switch also has a physical machine address on the network that is referred to as the Media Access Control (MAC) address. Both the IP and MAC addresses are recognizable by the Ethernet protocol. According to an alternative embodiment, the first access point AP1 detects the loss of the wired link by a method including tracking the gateway switch's IP or MAC address by periodically requesting the switch's address using the Ethernet link and determining whether the address was received in response. The periodic requests may include transmitting an echo message. The echo message may be a Packet Internet Groper (PING) command. An Address Resolution Protocol (ARP) command may alternatively be used if the gateway switch is in the same subnet, i.e., their IP address have the same prefix, as the first access point or if the tracking is based on the switch's MAC address.

Alternatively, other protocols including the Cisco Discovery Protocol (CDP) or the Link Layer Discovery Protocol (LLDP) may be used to check the status of the wired link. The CDP is a proprietary network protocol used by CISCO routers and switches to perform automatic neighbor discovery. The LLDP refers to the IEEE standard 802.1AB protocol that allows an Ethernet network device to advertise its identity and capabilities on the local network.

In Step 230, a determination is made whether the wired link is lost, indicating there may be failure. The process proceeds back to Step 220 if the loss is not detected. In Step 240, a determination is made whether the wired link is lost for greater than a predetermined minimum time, if a loss is detected. According to the present invention, the loss of the wired link must occur for a predetermined minimum time sufficient to determine that the loss is due to a failure for which recovery is needed. Preferably the predetermined time is one to two seconds. The periodic check in Step 220 is performed again if the loss does not exceed the minimum time. Step 246 is executed if it is detected that the wired link is lost for more than the predetermined minimum time.

In Step 246, the second radio of the first access point is reconfigured in a backhaul mode in response to the detection of the loss of the wired link for greater than the predetermined minimum time. In other words, in Step 246, the second radio of AP5 in the example in FIG. 5 is switched from the access mode to the backhaul mode.

Step 250 is the first step in reconfiguring the second radio in backhaul mode. In Step 250, any client nodes are disassociated from the second radio of the first access point, AP5. This is illustrated in the example in FIG. 6, where the 11a radio of AP5 has been disassociated from client node 12.

After the disassociation in Step 250, the method of the present invention includes detecting a neighboring access point which can provide a link to the wired network for the first access point AP5. The first step in this detecting of a neighboring access point, Step 260, includes causing the second radio of AP5 to broadcast a request for backhaul connectivity to neighboring APs. The second radio broadcasts the request preferably at its highest power and on all available channel bands.

In Step 270, the first access point AP5 detects whether any neighboring AP responds to the backhaul connectivity request.

In Step 280, the first access point AP5 selects a responding neighboring AP based on at least one predetermined criteria. Preferably the predetermined criteria include at least whether there is a communications path via the responding neighboring AP to the wired network.

In the example in FIG. 5, neighboring access point AP6 is one of the access points that responded to the backhaul connectivity request sent from the second radio of AP5. Both the request from AP5 and the response from AP6 are sent on the 11a wireless connection between AP5 and AP6 in the example. Alternatively, other suitable protocols including, but not limited to, 802.11n, may be used. As can be seen in FIG. 5, AP6 has a communications path on wired link Eth1 to switch 2 of the wired network; therefore, AP6 meets at least one of the preferred predetermined criteria in Step 280.

Preferably the predetermined criteria in Step 280 also include that the power of the signal received from the neighboring access point exceeds a predetermined threshold, and the signal power of the signal received by the neighboring access point exceeds a predetermined threshold, in order to ensure that the transmission between the two access points meets a predetermined threshold. Preferably the predetermined criteria also include a requirement that AP5 and the responding neighboring access point must have the same identification code and password. In the preferred embodiment, the identification code and password of the neighboring access point is determined from the response to the backhaul connectivity request.

Once a responding neighboring access point that meets the predetermined criteria is selected, in Step 290 the second radio of AP5 is caused to provide a wireless link to the selected neighboring AP AP6. The wireless link enables AP5 to detect the wired network connected to AP6. In the example in FIG. 5, the wireless link is the 11a connection between AP5 and neighboring AP6. FIG. 5 is exemplary only; the neighboring access point might be another access point that provides path to the wired network. The communication between the two access points is not limited to 11a as shown in FIG. 5; other suitable protocols may be used to practice the invention such as 11b/g, 11n, etc.

In Step 292, after the selecting in Step 280, the first access point is caused to enable any client nodes associated with its first radio and any client nodes that had been associated with its second radio to have a communication path to the wired network via a first radio wireless link, a second radio wireless link, and selected neighboring access point's wired link. In the example in FIG. 5, AP5 is caused to enable client node 8 associated with the first radio to have a communications path to switch 4 of the wired network via the first radio 11b/g wireless link, the second radio 11a wireless link to selected neighboring access point AP6, and the selected neighboring access point AP6's Eth1 wired link.

Client node 12 in FIG. 5 has been associated with the second radio of AP5 prior to the disassociation in Step 250. In the example in FIG. 5 for Step 292, AP5 is caused to enable client node 12 that had been associated with the second radio to be associated with the first radio via the first radio's 11b/g wireless link. That is, in the example in FIG. 5, client nodes 8 and 12 are both associated with the first radio. AP5 is caused, in Step 292, to enable client node 12 that had been associated with the second radio to have a communications path to the wired network via the first radio 11b/g wireless link, the second radio 11a wireless link to selected neighboring access point AP6, and the selected neighboring access point AP6's Eth1 wired link to the wired network. The link between AP5 and AP6 and the link between AP6 and the wired network, therefore, provide a backhaul wireless link for client nodes 8 and 12 via AP5.

The recovery process steps from detecting the loss for greater than a minimum time in Step 240 to Step 292 is preferably completed in five to fifteen seconds.

In Step 294, the first access point AP5 periodically checks the status of its wired link to the wired network. The check may be done by any of the methods described above with regard to Step 220.

A determination is made in Step 296, based on the periodic status checks in Step 294, whether the wired link has recovered such that it can again provide the wired link between the access point and the backhaul network, i.e., between AP5 and switch 2 in the example shown in FIG. 5. Preferably the recovery must be for a predetermined minimum time.

The process proceeds to Step 294 if recovery of the wired link is not detected in Step 296. In response to the detection of recovery of the wired link to the first access point in Step 296, the exemplary process proceeds to Step 298. In Step 298, the second radio of the first access point is selectively reconfigured in the access mode. In the example in FIG. 5, the second radio of AP5 is selectively reconfigured in the access mode from the backhaul mode shown in FIG. 5. In the backhaul mode, the second radio connected of AP5 connected to AP6 via the 11a connection. The second radio reconfigured in the access mode is enabled to be associated with the second client node, node 12 in FIG. 5. That is, in response to detection of recovery of the wired link between the first access point and the wired network, the first access point is configured again in an access mode as shown in FIG. 4, i.e., with the wired Eth0 link recovered.

Figure 7:
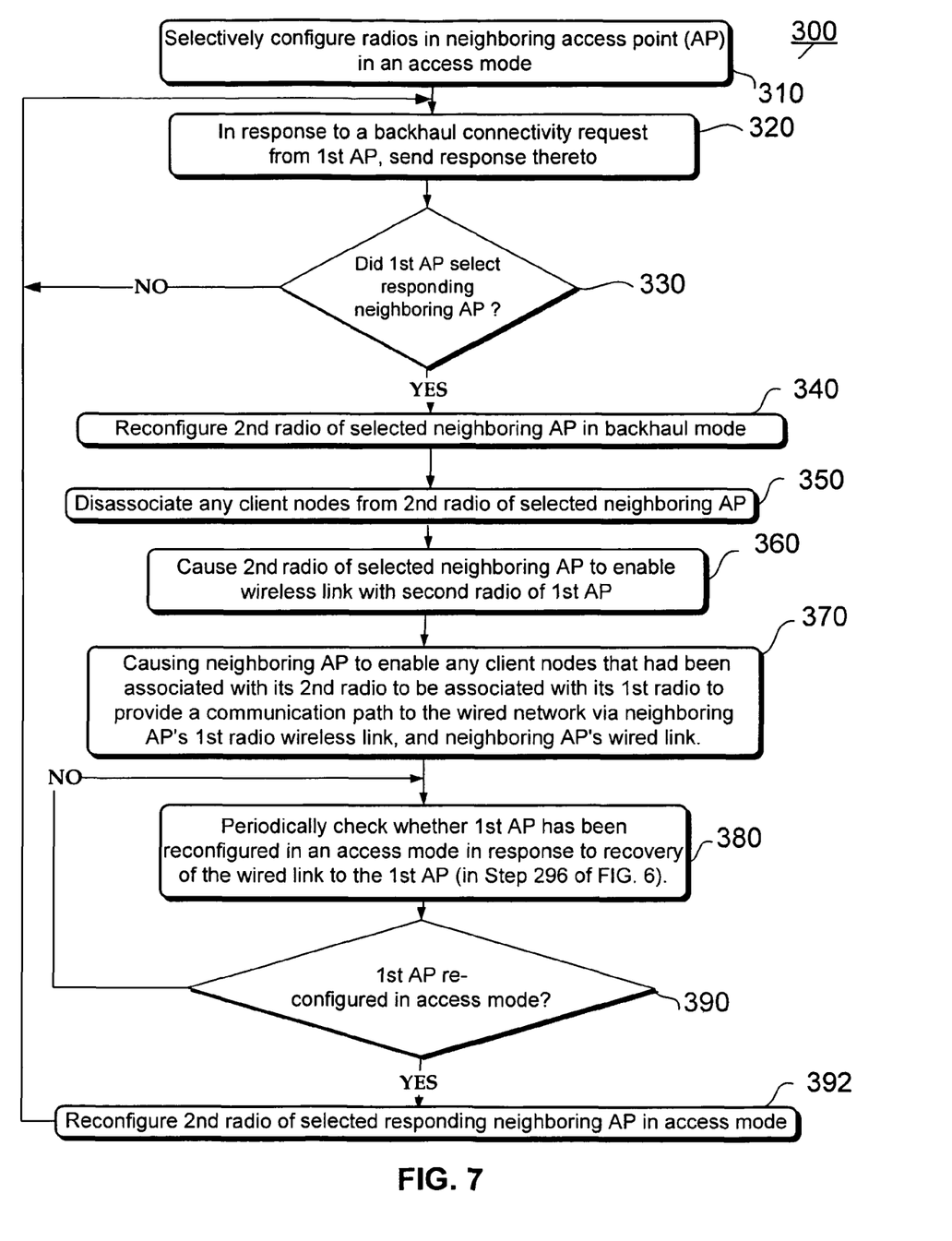
FIG. 7 is a flow chart illustrating further details for the selected responding neighboring access point according to an embodiment of the present invention.

FIG. 7 is a flow chart 300 illustrating further details for the selected responding neighboring access point according to an embodiment of the present invention. For purposes of illustration, AP6 in FIG. 5 is the selected neighboring access point in FIG. 6. The neighboring access point AP6 preferably includes a first and second radio. In Step 310, prior to selection in Step 280 in FIG. 6, each of the at least two radios of AP6 is selectively configured in an access mode for enabling a communications path with a corresponding client node 14 and 16 to enable each one to have a communication path via AP6 to the wired network. In the access mode, the first radio of AP6 operates preferably at 2.4 GHz in accordance with 11b/g and is enabled to be associated with a first client node 16, as shown in FIG. 4. A second radio of AP6 is enabled to be associated with a second client node 14 and operates preferably at 5 GHz in accordance with 11a as shown in FIG. 4. Alternatively, one or more of the radios may be operated in accordance with other suitable protocols including, but not limited to, 802.11n.

The selectively configuring of the first and second radios of the neighboring access point AP6 in the access mode enables each corresponding client node 14 and 16 to have a communication path via AP6 to the wired network, i.e., via Ethernet link Eth1 and switch 4, in FIG. 4.

In Step 320, in response to receipt of a backhaul connectivity request from the first access point Ap5, the neighboring access point AP6 responds to the backhaul connectivity request.

In Step 330, the neighboring access point AP6 determines whether it has been selected by the first access point to provide the wireless backhaul link.

In response to its selection as the responding neighboring AP, AP6 reconfigures its second radio to a backhaul mode in Step 340.

Step 350 is the first step in reconfiguring the second radio of selected neighboring AP6 in backhaul mode. In Step 350, any client nodes are disassociated from the second radio of the neighboring access point Ap6. This is illustrated in the example in FIG. 5, where the 11a radio of AP6 which as been associated with client node 14 in the access mode as seen in FIG. 4, has been disassociated from client node 14.

In Step 360, the neighboring access point AP6 caused its second radio to enable a wireless link to the first access point AP5, i.e., with the first access point AP5's second radio.

In Step 370, the neighboring access point is caused to enable any client nodes that had been associated with its second radio to be associated with the first radio to provide a communication path to the wired network via a first radio wireless link and AP6's wired link. As seen in FIG. 5, the communications path that enables both client nodes 14 and 16 to connect to AP6 is 11b/g and the first radio.

In Step 380, a periodic check is made regarding whether the access point AP5 has been reconfigured in an access mode in response to recovery of the wired link to AP5. In Step 390, a determination is made based on the periodic check in Step 380 whether the first access point has been reconfigured in an access mode in response to recovery of the wired link to the first access point (in Step 296 of FIG. 6). In a preferred embodiment, the access point AP5 and the neighboring access point AP6 periodically exchange messages to indicate failover status. Access point AP6 preferably detects the reconfiguration of access point AP5 in an access mode based on the status received. The process returns to Step 380 in response to determining that the first access point AP5 has not been reconfigured in an access mode.

In response to determining that the first access point AP5 has been reconfigured in an access mode in response to recovery of the wired link to AP5, the process proceeds to Step 392. In Step 392, the second radio of the neighboring access point AP6 is selectively reconfigured in an access mode. That is, in response to detecting that the access point AP5 has been reconfigured in an access mode in response to recovery of the wired link to AP5, the second access point AP6 is configured again in an access mode as shown in the example in FIG. 4, however, with the wired Eth0 link recovered. The reconfiguration in an access mode is made a predetermined minimum time after the detection that access point AP5 has been reconfigured in an access mode. The above example assumes that none of second access point AP6's other neighbors are requesting backhaul connectivity. That is, the second access point AP6 might remain configured in the backhaul mode, even after detecting that access point AP5 has been reconfigured in an access mode, in order to provide backhaul connectivity for other requesting neighboring access points. After Step 392, the process proceeds back to Step 320.

Having disclosed exemplary embodiments, modifications and variations may be made to the disclosed embodiments while remaining within the scope of the invention as described by the following claims.

What is claimed is:

1. A method for recovering from a failure of a wired link used for communication between a first access point and a wired network, said first access point having at least two radios including a first radio and a second radio each for providing a wireless communications link, the method comprising:

selectively configuring said radios in an access mode, each said radio in said access mode for enabling a communications path with a corresponding client node to enable each said client node to have a communication path via said first access point to the wired network, wherein said first radio is enabled to be associated with a first client node, and wherein said second radio is enabled to be associated with a second client node; and providing a communications path for said first and second client nodes to the wired network in response to detection of loss of the wired link to said first access point by selectively reconfiguring said second radio to a backhaul mode, comprising:

detecting said loss of the wired link to said first access point;

disassociating any client node from said second radio;

detecting a neighboring access point which can provide a link to the wired network for said first access point;

causing said second radio to provide a wireless link to said detected neighboring access point; and causing said first access point to enable any client nodes associated with said first radio and any client nodes that had been associated with said second radio to have a communication path to the wired network via said first radio wireless link, said second radio wireless link, and said detected neighboring access point's wired link;

wherein the second radio is used solely for the wireless link to said detected neighboring access point while the wired link to the first access point is lost.

2. The method of claim 1, wherein said detecting a neighboring access point includes;

causing said second radio to broadcast a request for backhaul connectivity to neighboring access points;

detecting whether any neighboring access point responds to said request; and selecting a responding neighboring access point based on at least one predetermined criteria.

3. The method of claim 1, further comprising:

detecting recovery of the wired link to said first access point; and in response thereto, selectively reconfiguring said second radio in said access mode, wherein said second radio is enabled to be associated with said second client node.

4. The method of claim 1, wherein the wired link comprises an Ethernet link and the first access point has an Ethernet port for providing a physical link to the Ethernet link.

5. The method of claim 4, wherein said Ethernet port has a link status indicative of the status of the wired link, and wherein the step of detecting said loss of the wired link to said first access point comprises obtaining said link status and determining therefrom whether the wired link is lost.

6. The method of claim 4, wherein the wired link provides a connection between the Ethernet port and a gateway switch, wherein said gateway switch comprises an address recognizable by an Ethernet protocol; wherein the step of detecting said loss of the wired link to said first access point comprises periodically requesting said address using the Ethernet link and determining whether the address was received by said first access point in response.

7. The method of claim 6, wherein said gateway switch comprises an Internet Protocol (IP) address and a Media Access Control (MAC) address.

8. The method of claim 6, wherein the periodic requesting comprises transmitting an echo message.

9. The method of claim 8, wherein said echo message is a PING command.

10. The method of claim 8, wherein said echo message is an Address Resolution Protocol (ARP) command.

11. The method of claim 2, wherein said at least one predetermined criteria include that there is a communications path via said responding neighboring AP to the wired network.

12. The method of claim 3, wherein said request and said response to said request each have an associated signal power and wherein said at least one predetermined criteria include that the signal power of said request and said response each exceed a predetermined threshold.

13. The method of claim 3, wherein said first access point has an associated identification code and password, and said at least one predetermined criteria include that said response of said neighboring access point includes the identification code and password of said neighboring access point which matches said first access point's identification code and password.

14. The method of claim 2, wherein said selected neighboring access point has at least two radios including a first radio and a second radio each for providing a wireless communications link, the method further comprising:

prior to detecting loss of the wired link, selectively configuring said radios of said detected neighboring access point in an access mode, each said radio of said selected neighboring access point in said access mode for enabling a communications path with a corresponding client node to enable each said client node to have a communication path via said selected neighboring access point to the wired network, wherein said first radio of said selected neighboring access point is enabled to be associated with a third client node, and wherein said second radio of said selected neighboring access point is enabled to be associated with a fourth client node.

15. The method of claim 14, further comprising selectively reconfiguring said second radio of said selected neighboring access point to a backhaul mode, comprising:

disassociating any client node from said second radio if said selected neighboring access point;

causing said second radio of said selected neighboring access point to enable a wireless link to said first access point; and causing said selected neighboring access point to enable any client nodes that had been associated with said selected neighboring access point's second radio to be associated with said selected neighboring access point's first radio to provide a communication path to the wired network.

16. The method of claim 2, further comprising detecting whether said first access point has been reconfigured in an access mode in response to recovery of the wired link to the first access point, and in response thereto, selectively reconfiguring said second radio of said selected neighboring access point in an access mode.

17. The method of claim 6, wherein there are one or more switches in a path between the first access point and the gateway switch.

18. The method of claim 1, wherein providing a communications path for said first and second client nodes to the wired network includes enabling any client nodes that had been associated with said second radio to be associated with said first radio.

19. A wireless backhaul failover system having a plurality of access points operative to recover from failure of a wired link used for communication between a first one of said access points and a wired network, a first access point having at least two radios including a first radio and a second radio each for providing a wireless communications link, means for causing said first access point to selectively configured said radios in an access mode, each said radio in said access mode for enabling a communications path with a corresponding client node to enable each said client node to have a communication path via said first access point to the wired network, wherein said first radio is enabled to be associated with a first client node, and wherein said second radio is enabled to be associated with a second client node; and means for selectively reconfiguring said second radio to a backhaul mode for providing a communications path for said first and second client nodes to the wired network in response to detection of loss of the wired link to said first access point, said means for selectively reconfiguring comprising:

means for detecting said loss of the wired link to said first access point;

means for disassociating any client node from said second radio;

means for detecting a neighboring access point which can provide a link to the wired network for said first access point;

means for causing said second radio to provide a wireless link to said detected neighboring access point; and means for causing said first access point to enable any client nodes associated with said first radio and any client nodes that had been associated with said second radio to have a communication path to the wired network via said first radio wireless link, said second radio wireless link, and said detected neighboring access point's wired link;

wherein the second radio is used solely for the wireless link to said detected neighboring access point while the wired link to the first access point is lost.

20. The system of claim 19, wherein the means for detecting a neighboring access point includes;

means for causing said second radio to broadcast a request for backhaul connectivity to neighboring access points;

means for detecting whether any neighboring access point responds to said request; and means for selecting a responding neighboring access point based on at least one predetermined criteria.

21. The system of claim 20, further comprising:

means for detecting recovery of the wired link to said first access point; and in response thereto, selectively reconfiguring said second radio in said access mode, wherein said second radio is enabled to be associated with said second client node.

* * * * *